United States Patent [19]

Jacono et al.

[11] 4,358,550
[45] Nov. 9, 1982

[54] PROCESS FOR PREPARATION OF AQUEOUS SOLUTIONS OF WATER-SOLUBLE POLYMERS

[75] Inventors: Louis Jacono, Newark; Thomas O. Mumper, Wilmington, both of Del.

[73] Assignee: Hercules Incorporated, Wilmington, Del.

[21] Appl. No.: 283,243

[22] Filed: Jul. 14, 1981

[51] Int. Cl.³ .......................................... C08L 101/00
[52] U.S. Cl. .............................. 523/348; 264/176 R; 264/141; 264/142
[58] Field of Search .......... 260/29.6 PM; 264/176 R, 264/141, 142; 523/348

[56] References Cited

U.S. PATENT DOCUMENTS

| | | | |
|---|---|---|---|
| B 579,153 | 3/1976 | Brinkmann et al. | 264/37 |
| 1,671,079 | 5/1928 | McManus | |
| 2,245,640 | 6/1941 | Beattie | 18/55 |
| 4,113,688 | 9/1978 | Pearson | 260/29.6 PM |

Primary Examiner—Joseph L. Schofer
Assistant Examiner—Bernard Lipman
Attorney, Agent, or Firm—Michael B. Keehan

[57] ABSTRACT

An improved process is provided for rapidly dissolving water-soluble polymer gels in which the gels are subjected to the steps of extrusion, cutting of the extruded gels, forming a slurry of gel particles, subjecting the slurry to high shear forces, and finally mixing the resulting slurry and water to form a dilute aqueous solution of polymer. The improvement comprises cutting of the water-soluble polymer gel, prior to extrusion, into pieces of gel of a size which are small enough to fit into space defined between adjacent flights of the extruder at the feed inlet of the extruder. The process enables dilute aqueous solutions to be prepared on a batch or continuous basis with good reproducibility of polymer concentration in the solution being prepared.

1 Claim, 1 Drawing Figure

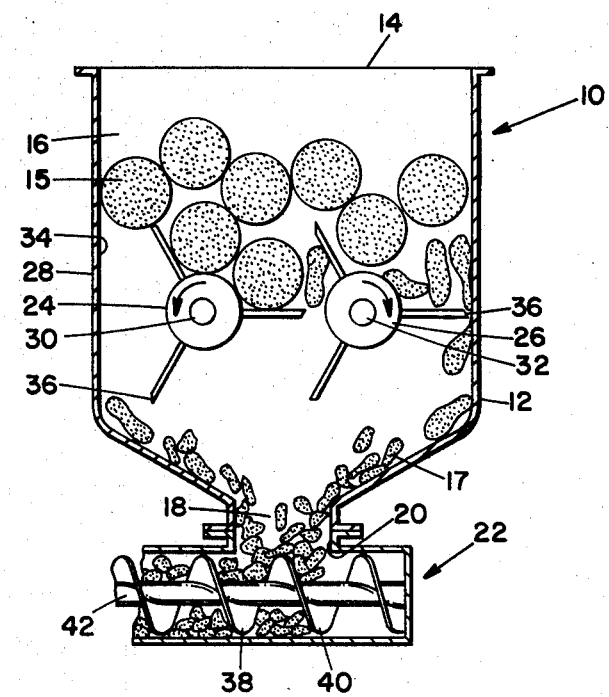

PROCESS FOR PREPARATION OF AQUEOUS SOLUTIONS OF WATER-SOLUBLE POLYMERS

FIELD OF THE INVENTION

This invention relates to an improved process for rapidly dissolving a water-soluble polymer gel in water to produce a dilute solution of the polymer in such a manner that the degradation of physical properties of the polymer is substantially reduced or minimized during the rapid formation of a dilute solution of the polymer and the concentration of polymer in solution can be easily controlled and is reproducible.

DESCRIPTION OF THE PRIOR ART

U.S. Pat. No. 4,113,688 describes a process for rapidly dissolving gels of water soluble polymers. The process of U.S. Pat. No. 4,113,688 broadly comprises the steps of:

(a) extruding water-soluble polymer gels into flowing water through die holes in an extrusion die plate, said die holes having diameters of from at least about 0.06 to about 0.50 inch, forming polymer gel strands, (b) cutting the extruding polymer gel strands at the exterior surface of the extrusion die plate to a length of less than about 0.75 inch, forming a slurry of the cut gel particles in the flowing water, (c) subjecting the slurry of gel particles of step (b) to high shearing forces immediately after formation of said slurry such that no substantial dissolution of the gel particles occurs prior to subjecting of said particles to said high shearing forces, said forces being sufficient to reduce the particle size of the cut gel particles to less than about 0.030 inch in greatest dimension, and (d) mixing the resultant slurry of fine gel particles and additional water under low shear conditions sufficient to maintain the suspension of particles in water rapidly forming a dilute aqueous solution of polymer.

In practice of the process described in U.S. Pat. No. 4,113,688, it is important that the rate of extrusion of the water soluble gels be substantially constant to enable dilute aqueous solutions of the polymer to be prepared having a substantially constant concentration in water. Polymer gels are generally prepared in the shape of logs or other shapes such as slabs or sheets which must be fed into the feed inlet of the extruder. The polymer gels are generally of a size and shape that exceeds the size of the opening in the extruder inlet such that size reduction of the gel is necessary to enable extrusion of the gel. Size reduction has often taken place by the cutting action of the extruder itself when the polymer gels are forced into the rotating screw flights of the extruder screw.

It has been observed that when logs of water-soluble polymer gel are stacked, one on top of the other, in a stack hopper to provide for continuous feed of polymer gel to an extruder, that variable extrusion rates result. Extrusion rates are a function of the weight and height of the logs of polymer gel in the stack hopper connected to the inlet to the extruder device. The data of Table I below illustrates the effect of the weight of polymer gel in a stack hopper on the rate of extrusion of the polymer gel.

TABLE 1

EXTRUSION RATE FOR POLYACRYLAMIDE GELS USING STACK HOPPER ON GEL EXTRUDER

| Gel Weight in Hopper (Lbs.) | Extrusion Rate (Lbs./Min.) |
|---|---|
| 243.1 | 10.1 |
| 192.8 | 10.9 |
| 138.4 | 8.8 |
| 94.6 | 2.6 |
| 81.5 | 1.1 |

The data in Table I shows that as the quantity of polymer gel in the stack hopper decreases as a result of extrusion of the polymer gel, the rate of extrusion of the polymer gel decreases. While it is possible to overcome the effects of variation in extrusion rates on polymer solution composition by weighing the amount of polymer gel to be extruded into a given amount of water prior to extrusion, for continuous operations it is desirable to be able to control polymer solution concentration by controlling the rate of extrusion.

DESCRIPTION OF THE INVENTION

In accordance with this invention, an improvement is provided over the process disclosed in U.S. Pat. No. 4,113,688 in that uniformity of polymer gel extrusion rate is readily controllable for both batch and continuous operation of the process thereby enabling the concentration of polymer in solution to be controlled through control of polymer extrusion rate.

The improved process of this invention results from an improvement in the extrusion step of the process described in U.S. Pat. No. 4,113,688 which comprises cutting the water-soluble polymer gel into pieces of gel of a size which are at least containable within the volume of the extruder which can be defined between adjacent flights of the extruder screw at the feed inlet of said extruder prior to feeding the polymer gel to the extruder and feeding the cut pieces of water-soluble polymer gel to said extruder at a rate such that there is no substantial bridging of the cut pieces of polymer gel at the feed inlet of the extruder.

The process of this invention is more fully described with reference to the following description and drawing.

DESCRIPTION OF THE DRAWING

The FIGURE is a schematic view of a feed cutter hopper which can be employed in carrying out the process of this invention.

As shown in the FIGURE, cutter-hopper 10 comprises a hopper body 12, having an open-top feed inlet-end 14, a feed storage section 16 and an outlet-end at its base 18. The outlet end 18 of the cutter-hopper 10 is in engagement with the inlet 20 of extruder 22. The outlet-end 18 of the cutter-hopper 10 and the inlet 20 of extruder 22 are in registration.

Near the base of the hopper body 12 are two three-bladed cutters 24, 26. The cutters 24, 26 extend across the cross-sectional area defined at the level of installation 28 of said cutters 24, 26 in the hopper body 12. The cutters are connected through shafts 30, 32 to drive means (not shown).

In operation, polymer gel in a form as produced, such as that of large logs 15 are loaded into the feed storage section 16 of the cutter hopper 10. Feed storage section 16 includes the volume of the cutter hopper 10 measured between the cutters 24, 26 and the top 14 of the cutter hopper 10. In operation, cutters 24, 26 are rotated by application of torque supplied by a drive means (not shown) through shafts 30 and 32. The cutters are rotated in opposite directions, one shaft turning clockwise and one shaft turning counterclockwise within the cutter hopper. The cutters may not be both rotated in the same direction as such operation can result in large uncut pieces of polymer falling into the extruder inlet causing bridging of polymer which results in force feed of the gel to the extruder which is not acceptable. In addition, the cutters must rotate so that cutting takes place at the walls of the hopper as illustrated. The three-bladed cutters 24, 26 are sharpened at the ends thereof and are mounted so as to be in near engagement with the side walls 34 which comprises the sides of hopper body 12. The logs 15 of polymer gel are cut as they become caught by a cutting surface 36 of a cutting blade and are forced against the side walls 34 of hopper body 12. The pieces of polymer gel 17, after cutting, fall to the inlet to the extruder into the area defined between adjacent screw flights 38, 40 of extruder screw 42. The size of the pieces of cut polymer gel 17 and the rate of cutting of the polymer gel logs are controlled so as to prevent any substantial bridging of polymer pieces 17 at the inlet of the extruder.

The cutter hopper described in the FIGURE feeds the polymer gel to the screw extruder by a gravity feed method. By cutting of the polymer gel logs prior to extrusion, substantial bridging of polymer at the inlet to the extruder is eliminated. Substantial bridging means the accumulation of polymer gel in the form of pieces of gel which are sufficiently large to span the inlet to the extruder or the outlet from the feed hopper, as the case may be, preventing gravity feeding of the gel polymer to the extruder screw.

The cutter hopper described in the drawing is one suitable means to be employed in operation of the improved process of this invention and represents the preferred device to be employed in conducting the improved process of this invention. However, any devices that can be adapted to cut the polymer gel into pieces of a size sufficiently small to be contained within the volume defined between adjacent flights of the extruder screw (at the inlet) by which the polymer is extruded, so that there is gravity feed of such cut pieces of polymer gel without substantial bridging of the polymer gel, can be employed in the process of this invention.

The following example further illustrates this invention.

EXAMPLE

Water soluble polymer gel having an intrinsic viscosity of 27.0 deciliters/gram measured in 2 Molal sodium chloride at 30.0° C. was prepared. The polymer gel was in the form of logs having an average diameter of about 9 inches and being about 18 inches each in length. The water soluble polymer gel was comprised by weight of 10% sodium acrylate and 90% acrylamide.

About 7 logs weighing 273.9 pounds were loaded into the feed section of a hopper having a configuration as described in the drawing. The cutters were operated at about 0.75 rpm and the clearance between the cutting surfaces of the cutter blades and the sides of the hopper were about 0.125 inch. Polymer pieces having a maximum dimension of about 4.0 inches resulted from one cutting action of the blades in the cutter hopper. The polymer pieces were fed to the inlet of an 8.0 inch diameter screw extruder in which the distance between adjacent flights on the extruder screw at the inlet thereto was about 10 inches. No substantial bridging of the cut polymer pieces occurred during the operation. The extrusion rate of the polymer employing the process of this invention was measured and is set forth in Table 2, below.

TABLE 2

| Gel Weight in Cutter Hopper (Lbs.) | Extrusion Rate (Lbs./Min.) |
|---|---|
| 273.9 | 8.2 |
| 233.1 | 8.5 |
| 190.5 | 8.8 |
| 146.5 | 8.8 |
| 102.5 | 9.3 |
| 55.9 | 8.7 |

The water-soluble polymer-gels which can be rapidly dissolved in accordance with the improved process of this invention are high molecular weight, water-soluble polymers having an intrinsic viscosity of at least 1 deciliter/gram (dl/g) measured in 2 N sodium chloride at 25.5° C. Such gels contain from about 10% to about 50% by weight of polymer and from about 50 to about 90% by weight of water. Illustrative polymers include those prepared from monomers derived from acrylamide and acrylic or methacrylic acids, or any of their amides, esters or salts, which, when polymerized alone, or in conjunction with one or more other monomers, will yield a water-soluble polymer.

Specific examples of the polymers which are prepared in the form of gels and which can be dissolved by the process of this invention are:

polyacrylamide, polyacrylamide partially hydrolyzed with an organic or inorganic base;

copolymers of acrylamide and an anionic monomer, such as the salts of acrylic or methacrylic acid or a sulfonate-containing acrylamide based monomer, such as sodium-2-acrylamido-2-methyl propane sulfonate;

copolymers of acrylamide and a cationic monomer such as (a) monomers prepared by reacting acrylates or methacrylates with dialkylamino alcohols, and having the general structural formula $CH_2=C(R)CO(CH_2)_M NR'R''$ where R, R' and R'' are hydrogen, lower alkyl having 1-4 carbon atoms, or benzyl radicals and $M=1-5$;

(b) monomers prepared by reacting acrylates and methacrylates with alkyldiamines, the resultant monomers having the general structural formula

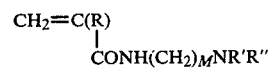

where R, R', R'' are hydrogen, lower alkyl having 1-4 carbon atoms, or benzyl radicals and $M=1-5$;

(c) diallyldimethylammonium chloride;

(d) salts prepared from the monomers described in (a) and (b) by reaction with mineral or organic acids;

(e) quaternary ammonium salts prepared from the monomers described in sections (a) and (b) by reaction with alkylating agents, such as lower alkyl halides or dialkylsulfates such as dimethyl sulfate, diethyl sulfate, methylethyl sulfate, methyl chloride, ethyl chloride, methyl iodide, methyl bromide and the like.

homopolymers of the anionic acrylate and acrylamide based monomers such as poly(sodium acrylate), poly(sodium-2-acrylamido-2-methyl propane sulfonate), and the like.

homopolymers of any of the cationic acrylamide based monomers described above, and the like.

The polymer gel which can be rapidly dissolved in accordance with the process of this invention may also contain nonpolymeric materials designed to stabilize the polymer, or to modify its physical or chemical properties in some way. These might include antioxidants and substances designed to lower the viscosity of the resultant gel solution by increasing its ionic strength, such as inorganic or organic salts, buffer systems, or pH modifiers.

The improved process of this invention has been described with reference to water-soluble polymer gels in the form of logs. The actual form (shape) of the polymer gel being fed to the extrusion step will be dependent upon its process of manufacture. Thus, the description of the process of this invention is not dependent upon polymer gels being initially in the form of logs of polymer gel.

What we claim and desire to protect by Letters Patent is:

1. An improved process for preparing dilute aqueous solutions of water-soluble polymer having an intrinsic viscosity of at least one deciliter per gram measured in 2 normal sodium chloride at 25.5° C. from gels of said polymer, said process comprising the steps of:
   (a) extruding the water-soluble polymer gels into flowing water through die holes in an extrusion die plate, said die holes having diameters of from at least about 0.06 inch to about 0.50 inch, forming polymer gel strands,
   (b) cutting the extruding polymer gel strands at the exterior surface of the extrusion die plate to a length of less than about 0.75 inch, forming a slurry of the cut gel particles in the flowing water,
   (c) subjecting the slurry of gel particles of step (b) to high shearing forces immediately after formation of said slurry such that no substantial dissolution of the gel particles occurs prior to subjecting of said particles to said high shearing forces, said forces being sufficient to reduce the particle size of the cut gel particles to less than about 0.030 inch in greatest dimension, and
   (d) mixing the resultant slurry of fine gel particles and additional water under low shear conditions sufficient to maintain the suspension of particles in water, rapidly forming a dilute aqueous solution of polymer, the improvement in the extrusion step of said process, which comprises cutting the water soluble polymer gel, prior to feeding of the polymer gel to an extruder having a feed inlet, and an extruder screw having screw flights for the extruding of said polymer gel, into pieces of gel of a size which are at least containable within the volume of the extruder which can be defined between adjacent flights of the extruder screw at the feed inlet of said extruder and feeding the cut pieces of water soluble polymer gel to said extruder so that there is no substantial bridging of said polymer gel at the feed inlet of the extruder.

* * * * *